United States Patent Office.

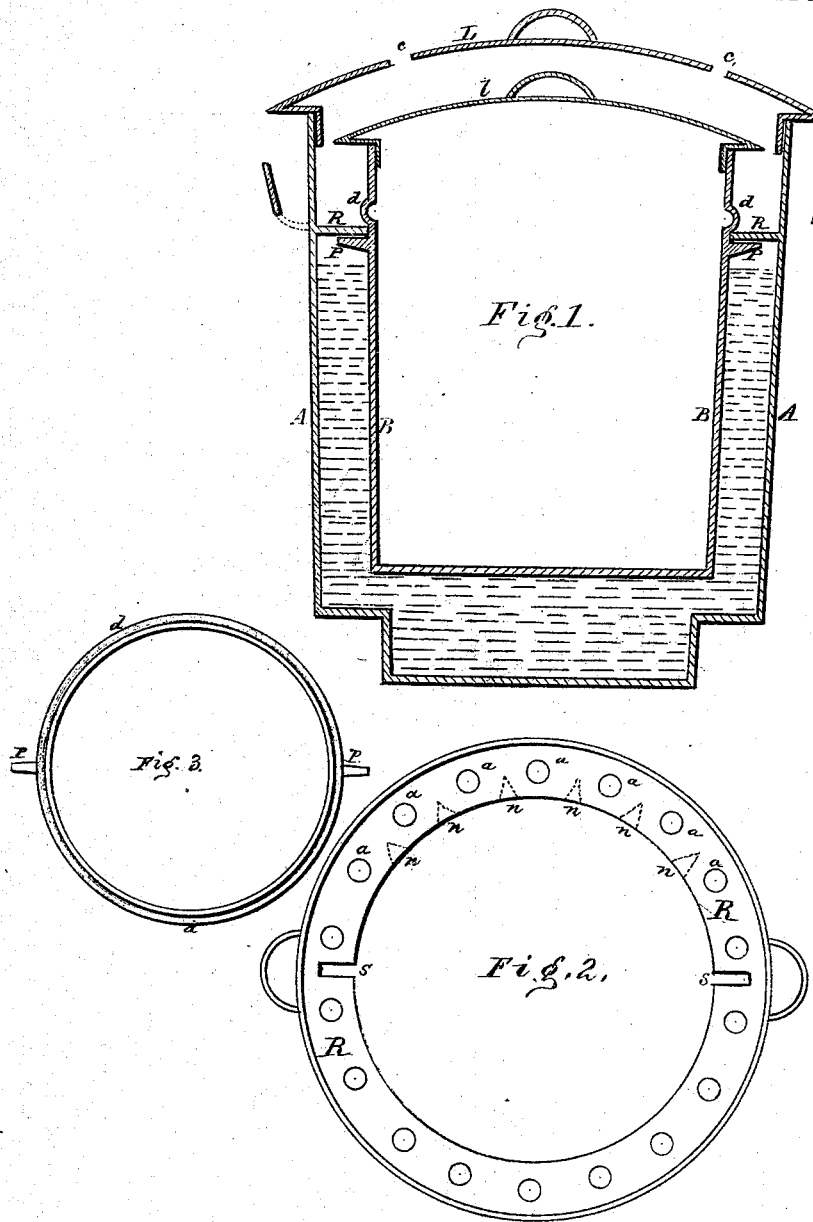

COOPER E. CORBETT, OF BINGHAMTON, NEW YORK.

Letters Patent No. 100,863, dated March 15, 1870.

CULINARY VESSEL.

The Schedule referred to in these Letters Patent and making part of the same

I, COOPER E. CORBETT, of Binghamton, in the county of Broome, in the State of New York, have invented certain Improvements in Culinary Apparatus, of which the following is a specification.

Nature and Objects of the Invention.

The object of this invention is to so arrange a kettle and boiler for culinary purposes that the material to be cooked shall not come in contact with the boiling water, nor be burned by the inner kettle which contains it coming in contact with the outer kettle or boiler; and also to cook or heat the food without steaming it, the arrangement being such that the food may be steamed if desired, a steam-chamber being formed between the kettle and boiler which will answer this purpose.

Description of Drawings.

Figure 1 is a sectional view of the kettle and boiler when prepared for use;

Figure 2, a plan of the outer kettle showing the perforated rim, and

Figure 3 a plan of the inner kettle, showing the ears or catches on the outside, on a reduced scale.

The outer boiler A is made of cast-iron or any other suitable material, with the rim R cast upon the inside, or otherwise attached thereto, at a short distance below the top of the kettle or boiler.

The rim R is perforated, as at $a\ a\ a$, or notched as at $n\ n\ n$, to allow the escape of steam.

The inside kettle B, made of sheet metal or other suitable material, fits into the perforated rim R and reaches nearly to the bottom of the boiler A.

It is prevented from settling too far into the outer boiler by the flange $d$, swaged on the outside at a short distance from the top, and is prevented from being raised up, by the water surrounding it, by the ears or catches P P attached to each side just below the flange $d$.

The substance to be cooked is placed in the kettle B, and the water in the boiler A.

A sufficient quantity of water should be put in the outer boiler to rise nearly to the rim R, when the kettle B is placed into it.

By passing the ears P P through the slots $s\ s$ in the rim R, and then turning the kettle B slightly, the ears will catch against the rim and hold the kettle down.

Should the weight of the material in the kettle B be sufficient to overcome the upward pressure of the water, the flange $d$ will prevent the kettle from descending.

As the water boils and throws off steam, the steam will escape through the perforated rim R and pass out of the outer cover L at $c\ c$.

The inner cover $l$ prevents the steam from entering the kettle B, but if it is desired to steam the food, this inside cover may be removed.

It will be seen that substances may be thoroughly heated and cooked without coming in direct contact with the water or steam.

In boiling, the water will not rise above the rim R far enough to overflow into the inner kettle B.

This arrangement will be found excellent for preparing fruit for canning, and for cooking puddings, and a variety of substances where it is desirable to keep them from contact with the boiling water or steam arising therefrom.

I claim—

The outer boiler A, having the perforated steam-rim R, provided with the slots $s\ s$, as described, in combination with the inner kettle B, having the ears or catches P P and the flange $d$, all arranged to operate substantially in the manner and for the purposes herein set forth.

C. E. CORBETT.

Witnesses:
  N. DU BOIS,
  CHAS. L. DU BOIS.